US012126094B2

(12) United States Patent
Gharbieh et al.

(10) Patent No.: US 12,126,094 B2
(45) Date of Patent: Oct. 22, 2024

(54) TRANSMIT OR REFLECTARRAY ANTENNA CELL

(71) Applicant: Commissariat à l'Energie Atomique et aux Energies Alternatives, Paris (FR)

(72) Inventors: Samara Gharbieh, Grenoble (FR); Antonio Clemente, Grenoble (FR); Bruno Reig, Grenoble (FR)

(73) Assignee: Commissariat à l'Energie Atomique et aux Energies Alternatives (FR)

(*) Notice: Subject to any disclaimer, the term of this patent is extended or adjusted under 35 U.S.C. 154(b) by 67 days.

(21) Appl. No.: 18/048,480

(22) Filed: Oct. 21, 2022

(65) Prior Publication Data

US 2023/0129840 A1 Apr. 27, 2023

(30) Foreign Application Priority Data

Oct. 26, 2021 (FR) ........................................ 2111361

(51) Int. Cl.
*H01Q 3/46* (2006.01)

(52) U.S. Cl.
CPC .................................... *H01Q 3/46* (2013.01)

(58) Field of Classification Search
CPC .................................. H01Q 3/44; H01Q 3/46
See application file for complete search history.

(56) References Cited

U.S. PATENT DOCUMENTS

| | | | |
|---|---|---|---|
| 11,133,588 B1 | 9/2021 | Matos et al. | |
| 2016/0013549 A1* | 1/2016 | Schaffner | H01Q 21/065 343/724 |
| 2017/0033462 A1* | 2/2017 | Clemente | H01Q 1/48 |
| 2021/0203077 A1 | 7/2021 | Tripon-Canseliet et al. | |

OTHER PUBLICATIONS

N. El-Hinnawy et al., "A Four-Terminal, Inline, Chalcogenide Phase-Change RF Switch Using an Independent Resistive Heater for Thermal Actuation," in IEEE Electron Device Letters, vol. 34, No. 10, pp. 1313-1315, Oct. 2013 (Year: 2013).*

Preliminary Search Report for French Application No. 2111361 dated Jun. 3, 2022, 2 pages.

Anagnostou, Dimitris E., David Torres, George Goussetis, Symon K. Podilchak, Tarron Teeslink, Nathan Kovarik, and Nelson Sepulveda. "Integration of resistive heaters for phase-change reconfigurable antennas." In 2017 11th European Conference on Antennas and Propagation (EUCAP), pp. 2349-2350. IEEE, 2017.

* cited by examiner

*Primary Examiner* — Robert Karacsony
(74) *Attorney, Agent, or Firm* — Jordan IP Law, LLC

(57) ABSTRACT

The present description concerns a transmitarray or reflectarray cell (105), comprising at least two switches made of a phase-change material.

9 Claims, 6 Drawing Sheets

TRANSMIT OR REFLECTARRAY ANTENNA CELL

FIELD

The present disclosure generally concerns electronic devices. The present disclosure more particularly concerns the field of transmitarray antennas and of reflectarray antennas.

BACKGROUND

Among the different existing radio communication antenna technologies, radio antennas called "transmitarray" are particularly known. These antennas generally comprise a plurality of elementary cells, each comprising a first antenna element irradiated by an electromagnetic field emitted by one or a plurality of sources, a second antenna element transmitting a modified signal to the outside of the antenna, and a coupling element between the first and second antenna elements.

Radio antennas called "reflectarray" are further known. These antennas generally comprise a plurality of elementary cells, each comprising a first antenna element irradiated by an electromagnetic field emitted by one or a plurality of sources, a reflector element, for example, a ground plane, reflecting a modified signal towards the outside of the antenna, and a coupling element between the antenna element and the reflector element. Conversely to the elementary cells of transmitarray antennas, which transmit a radio signal in a direction opposite to the source(s) irradiating their first antenna element, the elementary cells of reflectarray antennas reflect a radio signal towards the source(s) irradiating their antenna element.

For applications, for example, such as satellite communication ("SatCom"), it would be desirable to have reconfigurable transmitarray antennas and reflectarray antennas enabling to dynamically modify the phase of the radiated wave.

SUMMARY

There exists a need to improve existing transmitarray antennas and reflectarray antennas.

An embodiment overcomes all or part of the disadvantages of known transmitarray antennas and reflectarray antennas. An object of an embodiment more particularly is to allow an electronic phase control in a frequency range in the range for example from 50 to 350 GHz, corresponding to millimeter wavelengths, and to have switches having their biasing causing a decreased electric power consumption.

An embodiment provides a cell of a transmit array or of a reflect array, comprising at least two switches made of a phase-change material.

According to an embodiment, said phase-change material is a chalcogenide material.

According to an embodiment, each switch made of a phase-change material comprises a region of said phase-change material located on top of and in contact with first and second separate conductive regions of a patch antenna.

According to an embodiment, each switch of phase-change material further comprises a heater electrically insulated from the region of said phase-change material.

According to an embodiment, the switches made of a phase-change material form part of a first antenna element adapted to switching a radio frequency signal between at least two phase states.

According to an embodiment, the first antenna element comprises exactly two switches of phase-change material and a conductive plane having a ring-shaped opening, electrically insulating a central region of the conductive plane from a peripheral region of the conductive plane, each switch of phase-change material coupling the central region to the peripheral region of the conductive plane.

According to an embodiment, the cell further comprises a second antenna element connected to the first antenna element by a central conductive via, a ground plane interposed between the first and second antenna elements and electrically insulated from the central conductive via, the ground plane being connected to the second antenna element by two lateral conductive vias.

An embodiment provides a transmit array comprising a plurality of cells such as described.

According to an embodiment, the first antenna element comprises exactly two switches made of a phase-change material and a planar conductive frame inside of which are located first and second separate conductive regions, one of the two switches coupling the second conductive region to the planar conductive frame and the other switch coupling the first and second conductive regions to each other.

According to an embodiment, the first conductive region is connected to the planar conductive frame by a delay line.

According to an embodiment, the cell further comprises a reflector element connected to the first antenna element by a central conductive via.

An embodiment provides a reflect array comprising a plurality of cells such as described.

An embodiment provides an antenna comprising a transmit array such as described or a reflect array such as described and at least one source configured to irradiate a surface of the array.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, embodiments of a cell for a transmitarray antenna and embodiments of a cell for a reflectarray antenna will be described hereafter. The structure and the operation of the primary source(s) of the antenna, intended to irradiate the transmit array or the reflect array, will however not be detailed, the described embodiments being compatible with all or most of known primary irradiation sources for known transmitarray or reflectarray antennas. As an example, each primary source is capable of generating a beam of generally conical shape irradiating all or part of the transmit array or of the reflect array. Each primary source for example comprises a horn antenna. As an example, the central axis of each primary source is substantially orthogonal to the mean plane of the array.

Further, the described transmit array and reflect array manufacturing methods will not be detailed, the forming of the described structures being within the abilities of those skilled in the art based on the indications of the present description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms “front”, “back”, “top”, “bottom”, “left”, “right”, etc., or to relative positional qualifiers, such as the terms “above”, “below”, “upper”, “lower”, etc., or to qualifiers of orientation, such as “horizontal”, “vertical”, etc., reference is made to the orientation shown in the figures.

Unless specified otherwise, the expressions “around”, “approximately”, “substantially” and “in the order of” signify within 10%, and preferably within 5%.

Figure 1:
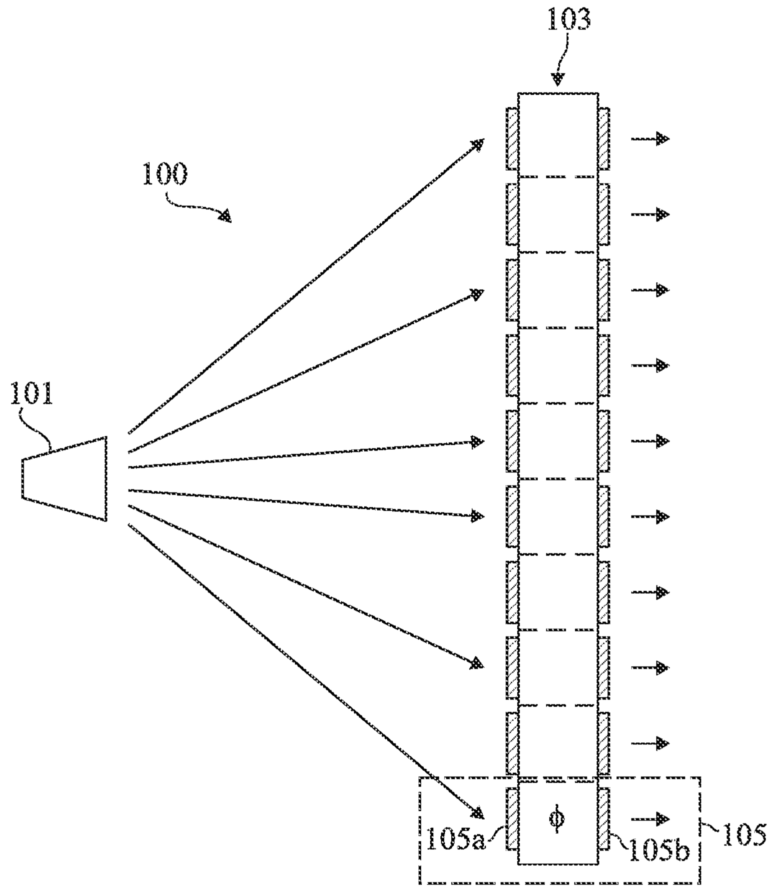
FIG. 1 is a partial simplified side view of an example of a transmitarray antenna of the type to which described embodiments apply as an example.

FIG. 1 is a partial simplified side view of an example of a transmitarray antenna 100 of the type to which described embodiments apply as an example.

Antenna 100 typically comprises one or a plurality of primary sources 101 (a single source 101, in the shown example) irradiating a transmit array 103. Source 101 may have any polarization, for example, linear or circular. Array 103 comprises a plurality of elementary cells 105, for example, arranged in an array of rows and of columns. Each cell 105 typically comprises a first antenna element **105*a*, located on the side of a first surface of array 103 located in front of primary source 101, and a second antenna element 105*b*, located on the side of a second surface of the array opposite to the first surface. The second surface of array 103 for example faces an emission medium of antenna 100**.

Each cell 105 is capable, in transmit mode, of receiving an electromagnetic radiation on its first antenna element **105*a* and of retransmitting this radiation from its second antenna element 105*b*, for example by introducing a known phase shift $\phi$. In receive mode, each cell 105 is capable of receiving an electromagnetic radiation on its second antenna element 105*b* and of retransmitting this radiation from its first antenna element 105*a*, towards source 101, with the same phase shift $\phi$. The radiation retransmitted by first antenna element 105*a* is for example focused onto source 101**.

The characteristics of the beam generated by antenna 100, and particularly its shape (or profile) and its maximum transmission direction (or pointing direction), depend on the values of the phase shifts respectively introduced by the different cells 105 of array 103.

Transmitarray antennas have the advantages, among others, of having a good energy efficiency, and of being relatively simple, inexpensive, and low-bulk. This is particularly due to the fact that transmit arrays may be formed in planar technology, generally on a printed circuit.

Reconfigurable transmitarray antennas 103 are here more particularly considered. Transmit array 103 is called reconfigurable when elementary cells 105 are individually electronically controllable to have their phase shift value $\phi$ modified, which enables to dynamically modify the characteristics of the beam generated by the antenna, and particularly to modify its pointing direction without mechanically displacing the antenna or a portion of the antenna by means of a motor-driven element.

Figure 2:
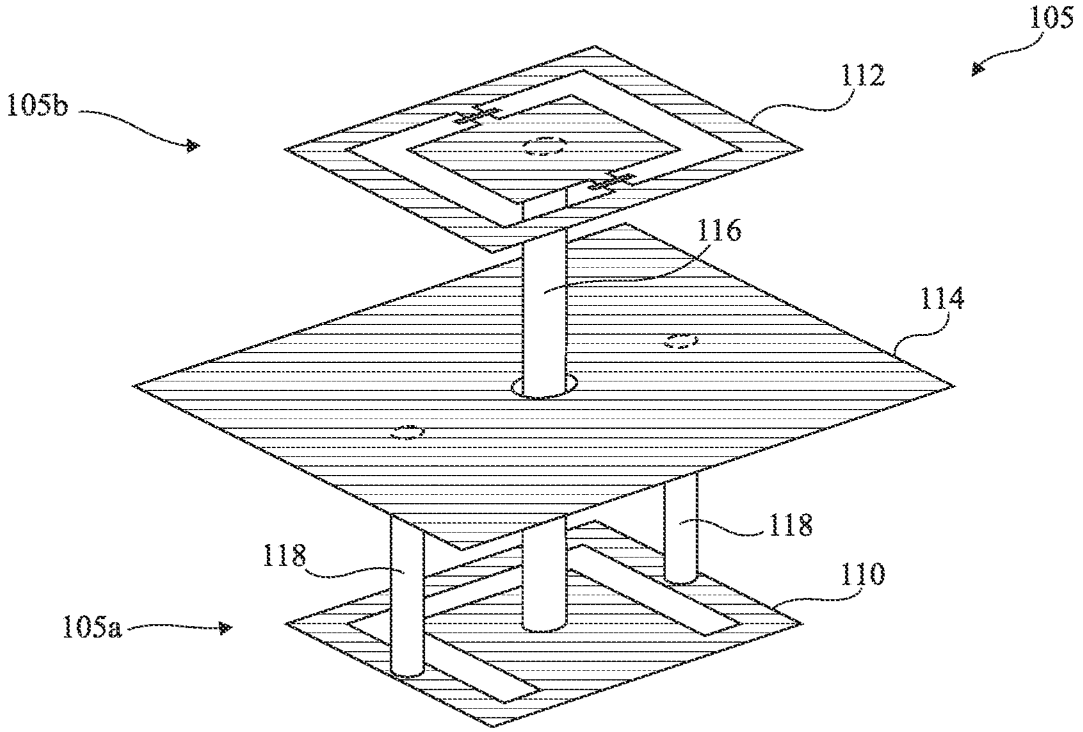
FIG. 2 is a partial simplified perspective view of an elementary cell of the transmit array of the antenna of FIG. 1 according to an embodiment.

FIG. 2 is a partial simplified perspective view of one of the elementary cells 105 of the transmitarray 103 of the antenna 100 of FIG. 1 according to an embodiment.

According to this embodiment, the first antenna element **105*a* of elementary cell 105 comprises a patch antenna 110 adapted to capturing the electromagnetic radiation emitted by source 101 and second antenna element 105*b* comprises another patch antenna 112 adapted to transmitting, towards the outside of antenna 100, a phase-shifted signal. In the shown example, elementary cell 105 further comprises a ground plane 114 interposed between patch antennas 110 and 112**.

Antenna 110, ground plane 114, and antenna 112 are for example respectively formed in three successive metallization levels, stacked and separated from one another by dielectric layers, for example, made of quartz. As an example, ground plane 114 is separated from each of antennas 110 and 112 by a thickness of dielectric material in the order of 200 μm.

In the shown example, a central conductive via 116 connects antenna 110 to antenna 112. More precisely, in the orientation of FIG. 2, via 116 has a lower end in contact with an upper surface of antenna 110 and an upper end in contact with a lower surface of antenna 112. Central conductive via 116 is electrically insulated from ground plane 114. In the shown example, ground plane 114 exhibits an orifice enabling via 116 to cross ground plane 114 without contacting it. As an example, central conductive via 116 has a diameter equal to approximately 80 μm.

Further, in this example, lateral conductive vias 118, located on either side of central conductive via 116, contact antenna 110 to ground plane 114. More precisely, in the orientation of FIG. 2, each via 118 has a lower end in contact with the upper surface of antenna 110 and an upper end in contact with a lower surface of ground plane 114.

Figure 3:
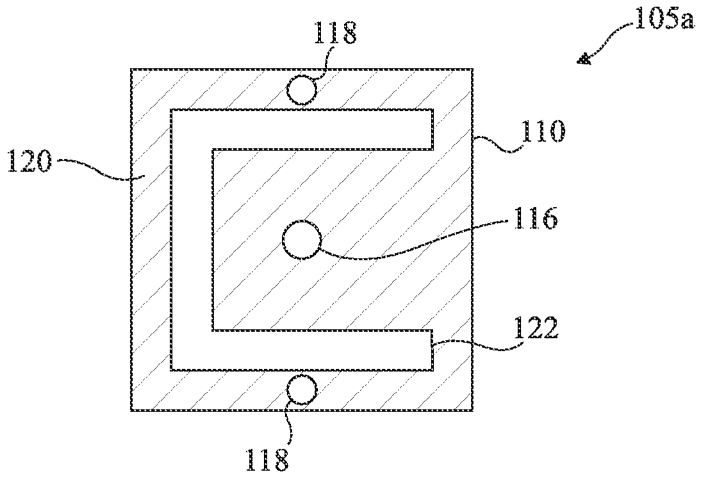
FIG. 3 is a partial simplified top view of a first antenna element of the elementary cell of FIG. 2.

FIG. 3 is a partial simplified top view of the first antenna element 105*a* of the elementary cell 105 of FIG. 2. FIG. 3 more precisely illustrates the patch antenna 110 of elementary cell 105.

In the shown example, patch antenna 110 comprises a conductive plane 120 of substantially square shape inside of which is formed a U-shaped slot 122, or groove. Slot 122 is for example substantially centered with respect to conductive plane 120. Central conductive via 116 contacts an area of conductive plane 120 located between the two branches of the U formed by slot 122. Via 116 is for example substantially connected to the center of conductive plane 120.

Further, in the example illustrated in FIG. 3, lateral conductive vias 118 are located on either side of slot 122. More precisely, each via 118 is for example connected to an area of conductive plane 120 located outside of the U formed by slot 122 and along one of the vertical branches of the U. In other words, in this example, the area of conductive plane 120 where each lateral via 118 is connected is separated from the area of conductive plane 120 where central via 116 is connected by one of the vertical branches of the U formed by slot 122.

As an example, the square formed by conductive plane 120 has a side length in the order of 0.44 mm, the vertical branches and the horizontal branch of the U formed by slot 122 each have a length in the order of 0.32 mm, and slot 122 has a width equal to approximately 50 μm.

Figure 4:
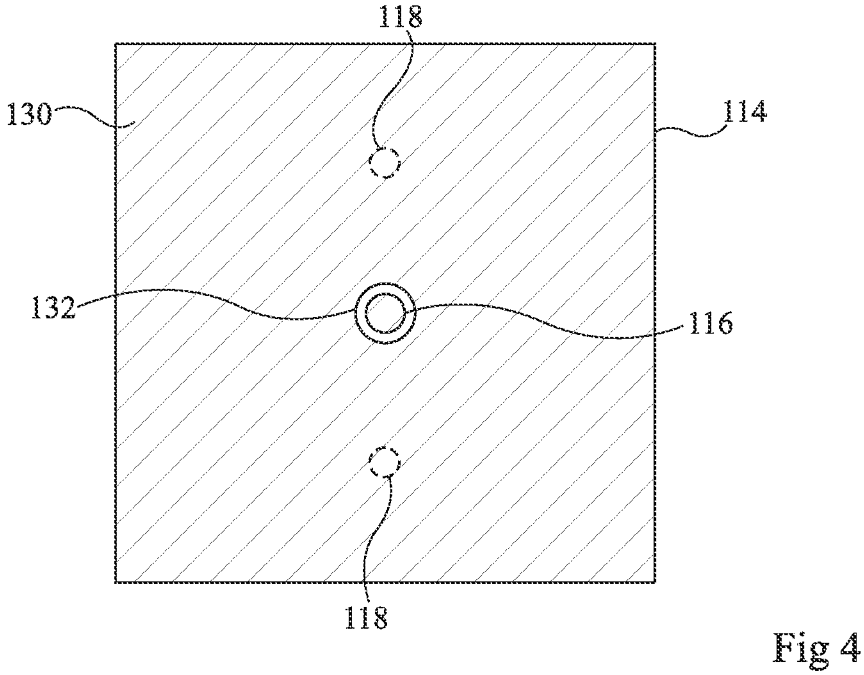
FIG. 4 is a partial simplified top view of a portion of the elementary cell of FIG. 2.

FIG. 4 is a partial simplified top view of a portion of the elementary cell 105 of FIG. 2. FIG. 4 more precisely illustrates ground plane 114 located between first and second antenna elements 105*a*, 105*b*.

In the shown example, ground plane 114 comprises a conductive plane 130 of substantially square shape. In this example, central conductive via 116 crosses ground plane 114 approximately at its center. Via 116 is insulated from conductive plane 130 by a ring-shaped opening 132 formed in conductive plane 130 around via 116. As an example, the square formed by conductive plane 130 has a side length in the order of 1 mm.

In this example, the side of the square formed by conductive plane 130 substantially defines the outer dimensions of the elementary cell 105 of transmit array 103.

Ground plane 114 is adapted to forming an electromagnetic shielding between antenna 110 and the antenna 112 of cell 105.

In the example illustrated in FIG. 4, lateral conductive vias 118 contact the lower surface of conductive plane 130 in areas diametrically opposite with respect to central conductive via 116. In this example, vias 116 and 118 are located on a same line parallel to one of the sides of conductive plane 130. Further, vias 118 are equidistant to via 116.

Figure 5:
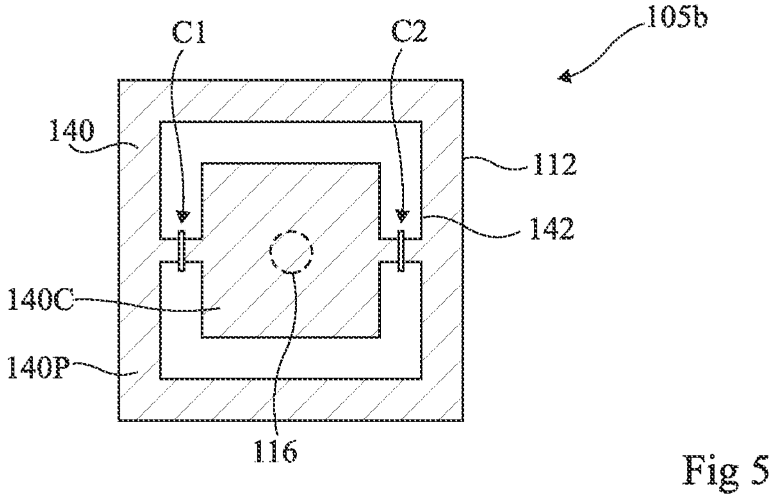
FIG. 5 is a partial simplified top view of a second antenna element of the elementary cell of FIG. 2.

FIG. 5 is a partial simplified top view of the second antenna element 105*b* of the elementary cell 105 of FIG. 2. FIG. 5 more precisely illustrates the patch antenna 112 of elementary cell 105.

According to an embodiment, antenna 112 comprises a four-sided conductive plane 140. Conductive plane 140 is for example more precisely rectangle-shaped or, as in the example illustrated in FIG. 5, substantially square-shaped.

According to this embodiment, conductive plane 140 comprises an opening 142 separating a central region 140C of conductive plane 140 from a peripheral region 140P of conductive plane 140. In this example, opening 142 is substantially ring-shaped, for example, with a rectangular or square ring shape.

In the shown example, central conductive via 116 contacts the central region 140C of conductive plane 140. More precisely, in this example, the upper end of via 116 is substantially connected to the center of a lower surface of region 140C. The central region 140C of conductive plane 140, laterally delimited by ring-shaped opening 142, for example forms an input terminal of antenna 112.

Antenna 112 further comprises a first switching element C1 and a second switching element C2, each coupling central region 140C to the peripheral region 140P of conductive plane 140. More precisely, in the example illustrated in FIG. 5, first and second switching elements C1, C2 contact peripheral region 140P in areas diametrically opposite with respect to central conductive via 116. In this example, switching elements C1, C2 and conductive via 116 are located on a same line parallel to one of the sides of conductive plane 140. In this example, switch C1 is located substantially vertically in line with the horizontal branch of the U formed by slot 122.

Switching elements C1 and C2 are controlled in opposition, that is, so that, if one of switches C1, C2 is on, the other switch C2, C1 is off. This enables the second antenna element 105*b* of elementary cell 105 to switch between two phase states ϕ, substantially equal to 0° and to 180° in this example. The 0° and 180° phase states respectively correspond to the case where switch C1 is off while switch C2 is on and to the case where switch C1 is on while switch C2 is off.

As an example, the square formed by conductive plane 140 has a side length in the order of 0.44 mm, the sides of square ring-shaped opening 142 each have a length in the order of 0.32 mm, and opening 142 has a width equal to approximately 50 μm.

Figure 6:
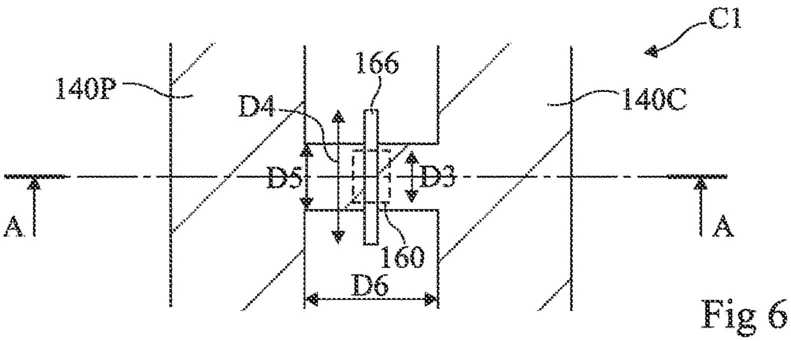
FIG. 6 is a partial simplified top view of a switching element of the second antenna element of FIG. 5.
Figure 7:
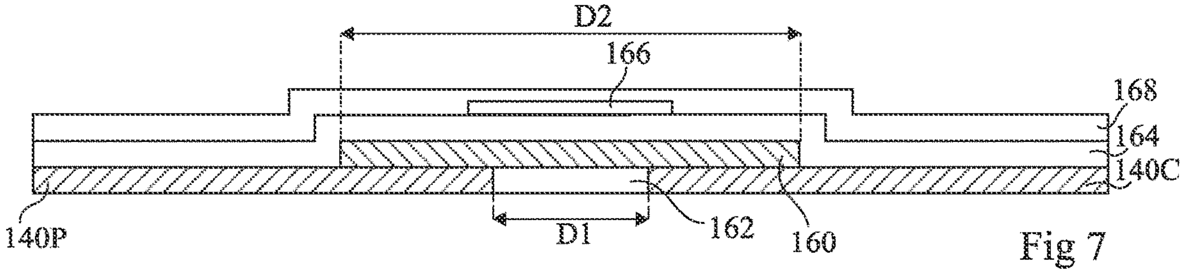
FIG. 7 is a cross-section view, along plane AA of FIG. 6, of the switch of the second antenna element of FIG. 5.

FIGS. 6 and 7 are views, respectively from the top and in cross-section along plane AA of FIG. 6, partial and simplified, of the switching element C1 of the second antenna element 105*b* of FIG. 5.

According to an embodiment, the switching element C1, or switch, is based on a phase-change material. Phase-change materials are materials that may switch, under the effect of heat, between a crystal phase and an amorphous phase, the amorphous phase having an electric resistance higher than that of the crystal phase. Advantage may in particular be taken of this phenomenon to form, as in the case of second antenna element 105*b*, switches having off (amorphous phase) and on (crystal phase) states differentiated by a resistance through the phase-change material.

In the example illustrated in FIG. 7, a continuous region 160 of phase-change material is located on top of and in contact with the upper surfaces of central 140C and peripheral 140P regions of conductive plane 140. In this example, regions 140C and 140P are disjoint and separated from each other by a distance D1 of approximately 1 μm.

In the shown example, an electrically-insulating region 162, for example, made of silicon dioxide, laterally separates central region 140C from the peripheral region 140P of conductive plane 140. Region 162 for example has a thickness substantially equal to that of conductive plane 140, for example, equal to approximately 0.6 μm, and laterally extends between regions 140C and 140P. Although this has not been shown in FIG. 7, other electrically-insulating regions coplanar with region 162 may further laterally extend between regions 140C and 140P as well as outside of region 140P. As an example, regions 140C and 140P may in practice be formed in a same electrically-insulating layer.

Region 160 of phase-change material integrally coats the upper surface of electrically-insulating region 162 and laterally extends on top of and in contact with portions of the upper surfaces of regions 140C and 140P adjacent to region 162. Region 160 for example has, in top view, a substantially rectangular shape of with D2 (FIG. 7) equal to approximately 3 μm and a length D3 (FIG. 6) equal to approximately 20 μm.

As an example, region 160 is made of a material called "chalcogenide", that is, a material or an alloy comprising at least one chalcogen element, for example, a material from the family of germanium telluride (GeTe) or of germanium-antimony-tellurium (GeSbTe, also designated with acronym "GST").

In the shown example, the upper surface and the lateral surfaces of layer 160, as well as portions of regions 140C and 140P non-coated with layer 160, are coated with an electrically-insulating layer 164, for example, made of silicon nitride. As an example, layer 164 has a thickness equal to approximately 0.4 μm.

In the shown example, switch C1 further comprises a heater 166 located on top of and in contact with electrically-insulating layer 164, above layer 160 of phase-change material. Heater 166 is thus electrically insulated from layer 160. Heater 166 for example has, in top view, a substantially rectangular shape, having a length D4 equal to approximately 37 μm, centered with respect to the rectangle formed by region 160 of phase-change material. As an example, heater 166 is made of a metal, for example, tungsten.

Heater 166 is for example intended to conduct an electric current enabling to heat, by Joule effect, the phase-change material of region 160. Such a heating mode is called indirect, as opposed to a direct heating where an electric current would flow inside of region 160 to cause its heating.

In this example, the upper surface and the lateral surfaces of heater 166, as well as portions of layer 164 non-coated with heater 166, are coated with an electrically-insulating layer 168, for example, made of silicon nitride. As an example, layer 168 has a thickness equal to approximately 0.2 μm.

Electrically-insulating layers 168 and 164 have not been shown in FIG. 6 to avoid overloading the drawing.

In top view, the regions 140C and 140P of conductive plane 140 form together, in the vicinity of the heater 166 of switch C1, an H-shaped structure having its horizontal portion having a width D5 equal to approximately 30 μm and having its two vertical branches separated from each other by a distance D6 equal to approximately 50 μm.

To toggle switch C1 from the off state to the on state, region 160 is for example heated, by means of heater 166, to a temperature T1 and for a duration d1. Temperature T1 and duration d1 are selected to cause a phase change of the material of region 160 from the amorphous phase to the crystal phase. As an example, temperature T1 is higher than a crystallization temperature and lower than a melting temperature of the phase-change material and duration d1 is in the range from 10 to 100 ns.

Conversely, to toggle switch C1 from the on state to the off state, region 160 is for example heated, by means of heater 166, to a temperature T2, higher than temperature T1, and for a duration d2, shorter than duration d1. Temperature T2 and duration d2 are selected to cause a phase change of the material of region 160 from the crystal phase to the amorphous phase. As an example, temperature T2 is higher than the melting temperature of the phase-change material and duration d2 is in the order of 10 ns.

Switch C2 for example has a structure, dimensions, and an operation similar to what has been previously described in relation with switch C1.

Further, although an indirectly-heated switch C1 where heater 166 is electrically insulated from region 160 of phase-change material has been described hereabove, there may be provided, as a variant, an indirectly-heated switch C1 comprising no heater and where region 160 would conduct an electric current enabling to cause its heating, or also a switch C1 having its phase changes caused by a light source, for example, a laser source illuminating region 160 via an optical fiber.

Figure 8:
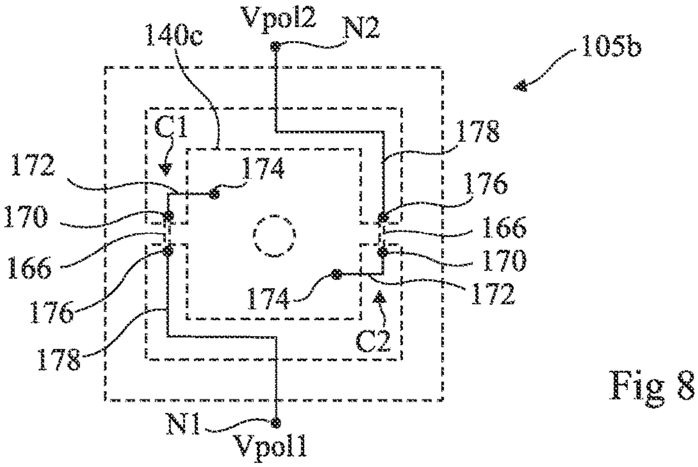
FIG. 8 is a partial simplified top view of an interconnection network associated with the second antenna element of FIG. 5.

FIG. 8 is a partial simplified top view of an interconnection network associated with the second antenna element 105*b* of FIG. 5.

In the shown example, the heater 166 of each switch C1, C2 of second antenna element 105*b* comprises a first end, or terminal, connected to the central region 140C of conductive plane 140 and a second end, or terminal, connected to a node N1, N2 of application of a bias potential Vpol1, Vpol2. More precisely, in this example, the first terminal of each heater 166 is connected, by a conductive via 170, to an end of a conductive track 172, the other end of conductive track 172 being connected to region 140C by another conductive via 174. The second terminal of each heater 166 is connected, by still another conductive via 176, to an end of another conductive track 178, the other end of conductive track 178 being connected to the corresponding node N1 or node N2. It may be provided for nodes N1 and N2 to be located in the metal level of conductive plane 140, the ends of conductive tracks 178 being for example connected to nodes N1 and N2 by conductive vias, not shown in FIG. 8.

As an example, conductive tracks 170 and 178 are formed on top of and in contact with the upper surface of an electrically-insulating layer (not shown), for example, a silicon dioxide layer having a thickness approximately equal to 3 μm, coating the upper surface of layer 168.

The bias potentials Vpol1 and Vpol2 applied to nodes N1 and N2 enable to control the flowing of an electric current through the heaters 166 of switches C1 and C2. By controlling the intensity and the duration of circulation of this current, the temperatures T1, T2 and the durations d1, d2 enabling to cause the phase changes of region 160 may for example be adjusted as previously discussed.

Figure 9:
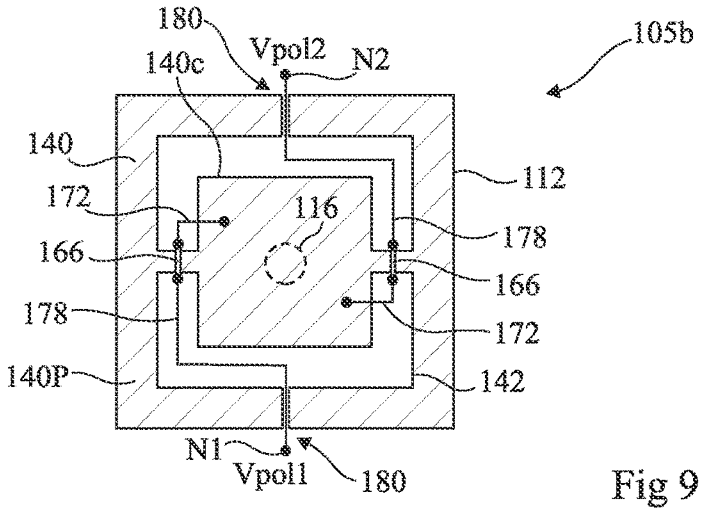
FIG. 9 is a partial simplified top view illustrating an alternative embodiment of the second antenna element of FIG. 5 and of the interconnection network of FIG. 8.

FIG. 9 is a partial simplified top view illustrating an alternative embodiment of the second antenna element 105*b* of FIG. 5 and of the interconnection network of FIG. 8. In this variant, conductive tracks 172 and 178 and conductive plane 140 are located in a same plane and vias 174 are omitted. Tracks 172 and 178 and plane 140 are for example formed in a same metallization level. Conductive tracks 172 and 178 are for example connected to the ends of heaters 166 by conductive vias, not shown in FIG. 9. In the shown example, the peripheral region 140P of conductive plane 140 comprises two openings 180 allowing the passage of the conductive tracks 178 connecting heaters 166 to nodes N1, N2 from the inside of ring-shaped opening 142 to the outside of peripheral region 140P. In this example, openings 180 are diametrically opposite with respect to central conductive via 116.

Although this has not been shown in FIGS. 8 and 9, conductive tracks 172 and/or 178 may comprise radio frequency filters.

Figure 10:
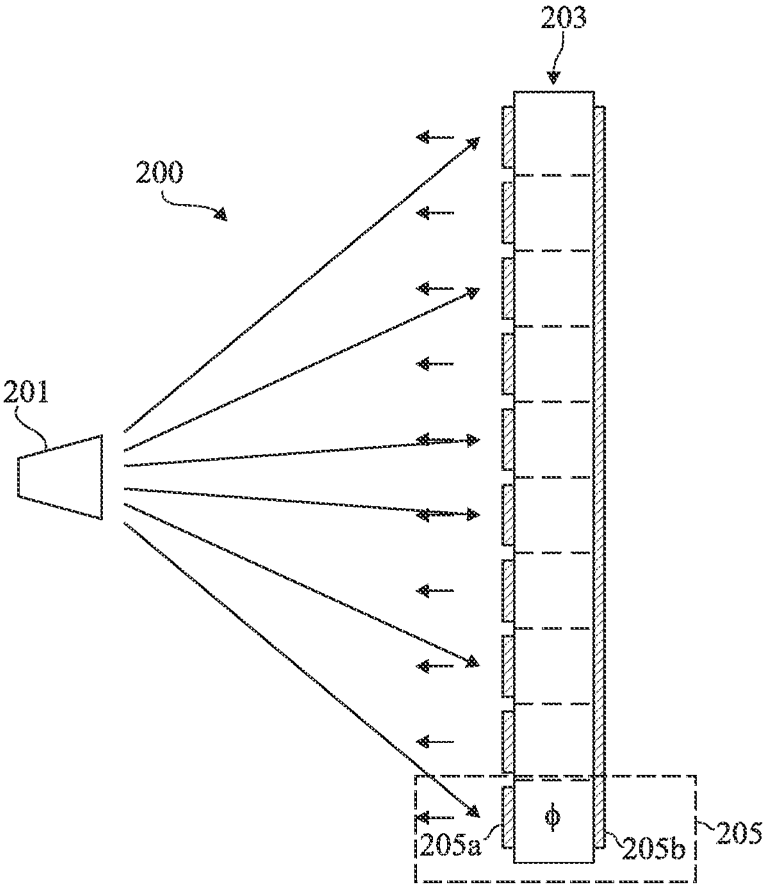
FIG. 10 is a partial simplified side view of an example of a reflectarray antenna of the type to which described embodiments apply as an example.

FIG. 10 is a partial simplified side view of an example of a reflectarray antenna 200 of the type to which described embodiments apply as an example.

Antenna 200 typically comprises one or a plurality of primary sources 201 (a single source 201, in the shown example) irradiating a reflect array 203. Source 201 may have any polarization, for example, linear or circular. Array 203 comprises a plurality of elementary cells 205, for example, arranged in an array of rows and of columns. Each cell 205 typically comprises an antenna element 205*a*, located on the side of a first surface of array 203 located in front of primary source 201, and a reflector element 205*b*, located on the side of a second surface of the array opposite to the first surface. The first surface of array 203 for example faces an emission medium of antenna 200. Reflector element 205*b* is for example, as illustrated in FIG. 10, common to all the elementary cells 205 of array 203.

Each cell 205 is capable, in transmit mode, of receiving an electromagnetic radiation emitted by source 201 on its antenna element 205*a* and of retransmitting this radiation, after reflection by reflector element 205*b*, from its antenna element 205*a*, for example by introducing a known phase shift ϕ. In receive mode, each cell 205 is capable of receiving an electromagnetic radiation on its antenna element 205*b* and of retransmitting this radiation, after reflection by reflector element 205*b*, from its antenna element 205*a*, towards source 201, with the same phase shift ϕ. The radiation reemitted by antenna element 205*a* is for example focused on source 201.

The characteristics of the beam generated by antenna 200, and particularly its shape (or profile) and its maximum transmission direction (or pointing direction), depend on the values of the phase shifts respectively introduced by the different cells 205 of array 203.

Reflectarray antennas have advantages similar to those of transmitarray antennas.

Reconfigurable reflectarray antennas 203 are here more particularly considered, that is, having their elementary cells 205 individually electronically controllable to modify their phase-shift value ϕ similarly to what has been previously described in relation with antenna 100 comprising a transmitarray 103.

Figure 11:
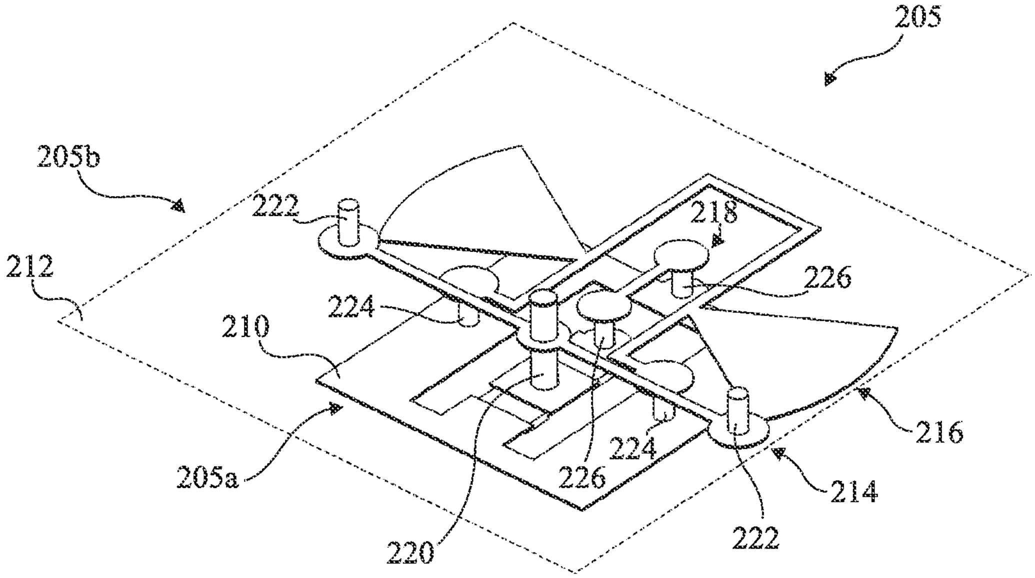
FIG. 11 is a partial simplified perspective view of an elementary cell of the reflect array of the antenna of FIG. 10 according to an embodiment.

FIG. 11 is a partial simplified perspective view of an elementary cell 205 of the reflect array 203 of the antenna 200 of FIG. 10 according to an embodiment.

According to this embodiment, the antenna element 205*a* of elementary cell 205 comprises a patch antenna 210 adapted to capturing the electromagnetic radiation emitted by source 201 and to transmitting, towards the outside of antenna 200, a phase-shifted signal, and reflector element 205*b* comprises a ground plane 212. In the shown example, elementary cell 205 further comprises an interconnection structure 214, a radio frequency filtering or decoupling structure 216, and a delay line 218.

Antenna 210, delay line 218, structure 216, structure 214, and ground plane 212 are for example respectively formed in five successive stacked metallization levels separated from one another by dielectric layers.

In the shown example, a central conductive via 220 connects antenna 210 to ground plane 212. More precisely, in the orientation of FIG. 11, via 220 has a lower end in contact with an upper surface of antenna 210 and an upper end in contact with a lower surface of ground plane 212. Via 220 is further connected to a central portion of interconnection structure 214. As illustrated in FIG. 11, conductive vias 222 connect ends of structure 214 to ground plane 212. Further, conductive vias 224 connect ends of the radio frequency filtering structure 216 to patch antenna 210 and other conductive vias 226 connect ends of delay line 218 to antenna 210.

Antenna 210, delay line 218, radio frequency filtering structure 216, interconnection structure 214, and ground plane 212 are described in further detail hereafter in relation with respective FIGS. 12 to 16.

Figure 12:
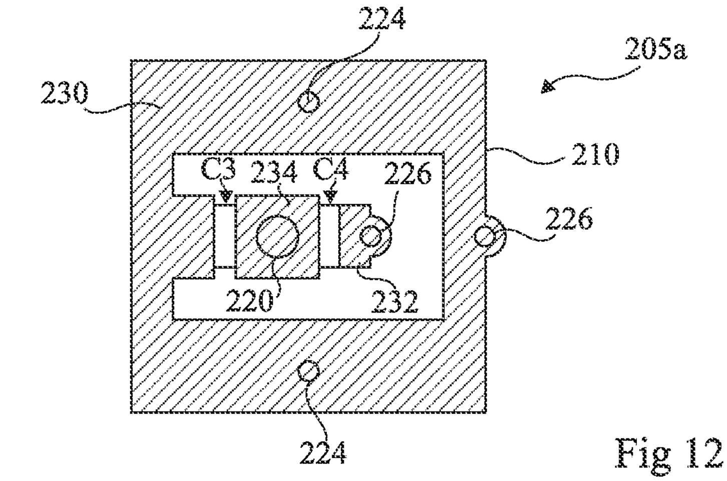
FIG. 12 is a partial simplified top view of an antenna element of the elementary cell of FIG. 11.

FIG. 12 is a partial simplified top view of the antenna element 205*a* of the elementary cell 205 of FIG. 11.

In the shown example, the patch antenna 210 of antenna element 205*a* comprises a planar conductive frame 230 and separate conductive regions 232 and 234 located inside of frame 230. In this example, frame 230 and regions 232 and 234 are coplanar.

Conductive region 234 is in contact with central conductive via 220 and is coupled to conductive frame 230 by a switching element C3, or switch, having a conduction terminal for example in contact with region 234 and having another conduction terminal for example in contact with frame 230. In the shown example, conductive region 234 is further coupled to conductive region 232 by another switching element C4, having a conduction terminal for example in contact with region 234 and having another conduction terminal for example in contact with region 232.

Each switch C3, C4 of the antenna element 205*a* of the elementary cell 205 of reflect array 203 for example has a structure, dimensions, and an operation similar to what has been previously described in relation with the switches C1 and C2 of the antenna element 105*b* of the elementary cell 105 of transmit array 103. In particular, switching elements C3 and C4 are controlled in opposition. This enables the antenna element 205*a* of elementary cell 205 to switch between two phase states ϕ, for example substantially equal to 0° and to 180°. The 0° and 180° phase states respectively correspond to the case where switch C3 is on while switch C4 is off, and to the case where switch C3 is off while switch C4 is on.

Figure 13:
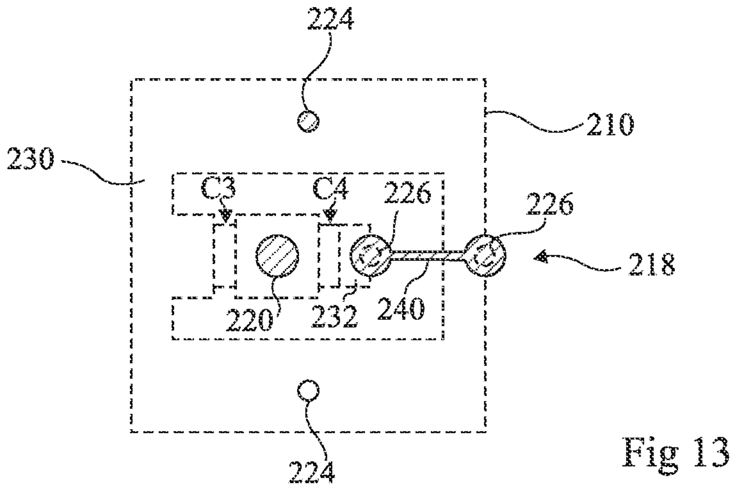
FIG. 13 is a partial simplified top view of a portion of the elementary cell of FIG. 11.

FIG. 13 is a partial simplified top view of a portion of the elementary cell 205 of FIG. 11. FIG. 13 more particularly illustrates delay line 218.

In the shown example, the delay line comprises a conductive track 240 having an end connected to conductive region 232, via one of the two conductive vias 226, and having its other end connected to frame 230, via the other conductive via 226. As an example, track 240 and vias 226 form a conduction path having a total length adjusted so that the phase shift introduced when switch C4 is on is equal to ϕ, that is, to approximately 180° in this example.

Figure 14:
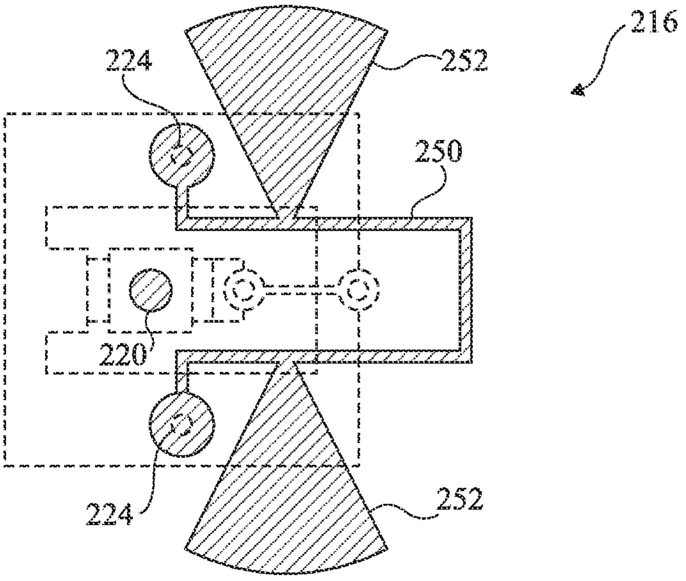
FIG. 14 is a partial simplified top view of another portion of the elementary cell of FIG. 11.

FIG. 14 is a partial simplified top view of another portion of the elementary cell 205 of FIG. 11. FIG. 14 more particularly illustrates radio frequency filtering structure 216.

In the shown example, structure 216 comprises a U-shaped conductive track 250 having an end connected to one of conductive vias 224 and having its other end connected to the other via 224. In this example, structure 216 further comprises radio frequency decoupling elements or stubs 252, for example, in the form of a disk sector, connected to conductive track 250. In the example illustrated in FIG. 14, structure 216 more precisely comprises two elements 252, each element being connected to one of the vertical branches of the U formed by track 250.

Figure 15:
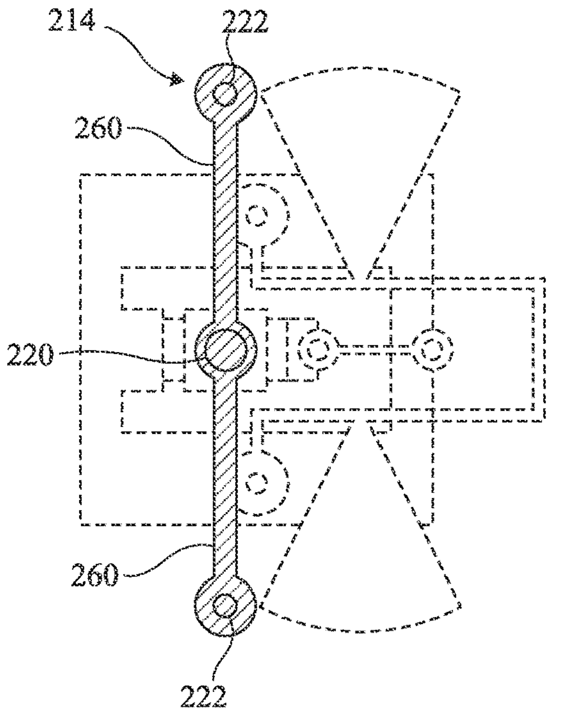
FIG. 15 is a partial simplified top view of still another portion of the elementary cell of FIG. 11.

FIG. 15 is a partial simplified top view of still another portion of the elementary cell 205 of FIG. 11. FIG. 15 more particularly illustrates interconnection structure 214.

In the shown example, structure 214 comprises two conductive tracks, each connecting one of conductive vias 222 to central conductive via 220. Conductive tracks 260 extend for example laterally, above ground plane 212 in the orientation of FIG. 15, in diametrically opposite directions from central via 311 to vias 260. In this example, tracks 260 are aligned and have identical lengths. Each conductive track 260 for example forms a quarter wave line (λ/4), that is, a line having a length substantially equal to one quarter of the operating wavelength of the antenna.

Figure 16:
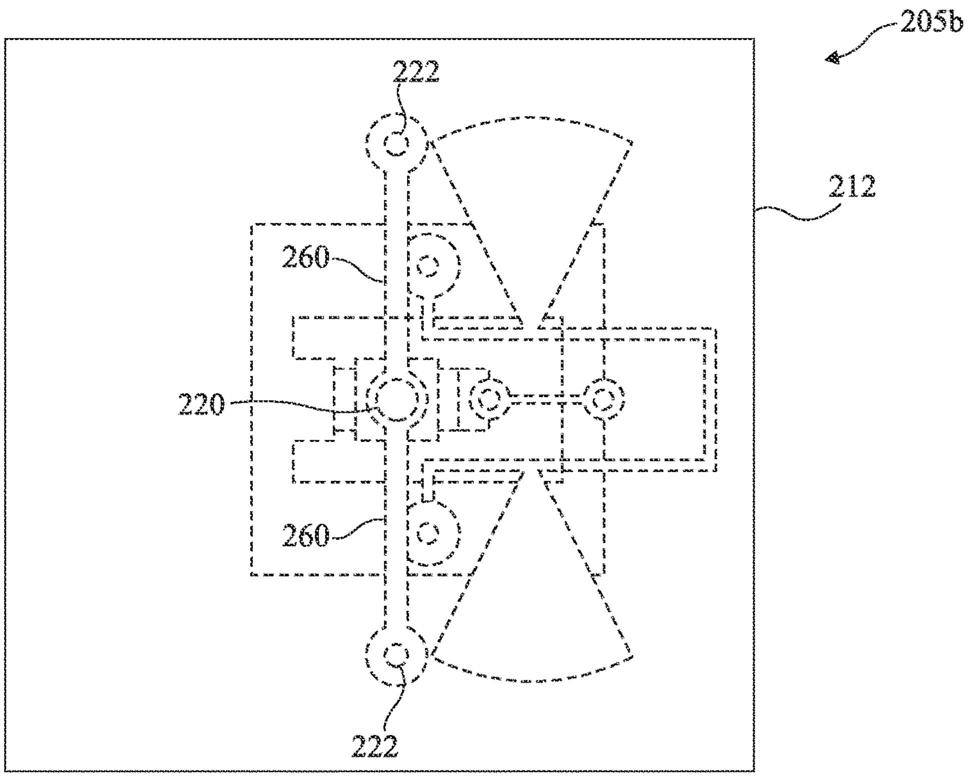
FIG. 16 is a partial simplified top view of a reflector element of the elementary cell of FIG. 11.

FIG. 16 is a partial simplified top view of the reflector element 205*b* of the elementary cell 205 of FIG. 11.

In the shown example, the central conductive via 220 and the conductive vias 222 located at the end of the quarter wave lines 260 of interconnection structure 214 are connected to the ground plane 212 of reflector element 205*b*.

Preferably, the cells 105 and 205 of arrays 103 and 203 are formed by a method comprising successive steps of forming, on a same substrate, for example, made of quartz, of antennal elements 105*a* and 105*b* in the case of array 103 and of reflector element 205*b* and of antenna element 205*a*, in the case of array 203. In particular, the switches C1 and C2 of cells 105 are for example formed on the substrate at the end of the forming of the central 140C and peripheral 140P regions of conductive plane 140. Similarly, the switches C3 and C4 of cells 205 are for example formed on the substrate at the end of the forming of planar conductive frame 230 and of conductive regions 232 and 234. In this case, cells 105 and 205 (and arrays 103 and 203) have a structure called "monolithic". As an example, the method of manufacturing cells 105 and 205 particularly does away with transfer steps, and cells 105 and 205 comprise no interconnection elements, such as pads assembled to solder bumps, between first antenna element 105*a*, 205*a* and second antenna element 105*b* or reflector element 205*b*.

An advantage of the switches C1, C2, C3, and C4 of phase-change material integrated to elementary cells 105 and 205 lies in the fact that they are capable of operating at at least as high power levels as switches generally used in elementary cells of reconfigurable transmitarray or reflectarray antennas, while having a better linearity. Further, switches C1, C2, C3, and C4 have an excellent stability in frequency ranges in the order of one terahertz.

An advantage of cells 105 and 205 lies in the fact that they allow an electronic phase control in a frequency range for example in the range from 50 to 350 GHz, corresponding to millimeter wavelengths, and that they have a decreased electric power consumption.

Various embodiments and variants have been described. It will be understood by those skilled in the art that certain characteristics of these various embodiments and variants may be combined, and other variants will occur to those skilled in the art. In particular, the shape of antenna elements 105*a* and 205*a* may be adapted according to the biasing of the associated source 101, 201.

Further, although examples of elementary cells 105 and 205 each comprising two switches made of phase change material C1, C2, and C3, C4 have been described, the described embodiments may be transposed by those skilled in the art to any number of switches of phase-change material. As an example, a number of switches of phase-change material greater than two may be provided in a case where it would be desired to form a reconfigurable elementary cell having more than two different phase states.

Embodiments where the heater of the switches of phase-change material is a resistive element intended to heat the phase-change material by Joule effect have been described hereabove in relation with FIGS. 1 to 16. As a variant, it may be provided for the heater to be a waveguide electrically insulated from the region of phase-change material and comprising a first end in front of a surface of the region of phase-change material and a second end, opposite to the first end, intended to be illuminated by a laser source. In this case, the waveguide for example comprises a central region made of silicon nitride (SiN) surrounded with a peripheral region made of silicon dioxide (SiO2). The laser source may be of integrated type, that is, forming part of a same chip as the switch(es) with which it is associated, or non-integrated, that is, formed on a chip different from that of the switch(es) with which it is associated, the laser source being then for example connected to the waveguide of each switch with which it is associated by an optical link, for example, an optical fiber. Further, optical couplings between the laser source and the waveguide, and between the waveguide and the region of phase-change material, may each be obtained by an "adiabatic"-type coupling, or by a so-called "butt coupling". In the case of an adiabatic coupling between the waveguide and the region of phase-change material, the outlet surface of the waveguide for example has a tapered shape, narrowing in the vicinity of the region of phase-change material, while the latter is capable of having a tapered shape narrowing in the vicinity of the waveguide.

Finally, the practical implementation of the described embodiments and variants is within the abilities of those skilled in the art based on the functional indications given hereabove. In particular, the practical implementation of switches C1, C2, C3, and C4 in the above-described elementary cells is adaptable by those skilled in the art according to the application.

What is claimed is:

1. A cell of a reflect array, comprising at least two switches made of a phase-change material, each switch of phase-change material comprising:
   - a region made of said phase-change material located on top of and in contact with first and second separate conductive regions of a patch antenna; and
   - a heater electrically-insulated from the region of said phase-change material,
   - wherein the switches of phase-change material form part of a first antenna element adapted to switching a radio frequency signal between at least two phase states,
   - and wherein the first antenna element comprises exactly two switches made of a phase-change material and a planar conductive frame inside of which are located first and second separate conductive regions, one of the two switches coupling the second conductive region to the planar conductive frame and the other switch coupling the first and second conductive regions to each other.

2. The cell according to claim 1, wherein said phase-change material is a chalcogenide material.

3. The cell according to claim 1, wherein the heater is a resistive element intended to heat the phase-change material by Joule effect.

4. The cell according to claim 1, wherein the heater is a waveguide comprising a first end in front of a surface of the region of said phase-change material and a second end, opposite to the first end, intended to be illuminated by a laser source.

5. The reflect array cell according to claim 1, wherein the first conductive region is connected to the planar conductive frame by a delay line.

6. The reflect array cell according to claim 1, further comprising a reflector element connected to the first antenna element by a central conductive via.

7. A reflect array comprising a plurality of cells according to claim 1.

8. The reflect array cell according to claim 1, wherein the reflector element and the first antenna element are successively formed on a same substrate to obtain a monolithic structure.

9. An antenna comprising a reflect array according to claim 7 and at least one source configured to irradiate a surface of the array.

* * * * *